(12) United States Patent
Dausch

(10) Patent No.: US 6,814,182 B2
(45) Date of Patent: Nov. 9, 2004

(54) AIR-DIFFUSION PANEL FOR A MOTOR VEHICLE

(75) Inventor: Uwe Dausch, Le Mesnil St Denis (FR)

(73) Assignee: Valeo Climatisation, La Verriere (FR)

( * ) Notice: Subject to any disclaimer, the term of this patent is extended or adjusted under 35 U.S.C. 154(b) by 43 days.

(21) Appl. No.: 09/971,605

(22) Filed: Oct. 9, 2001

(65) Prior Publication Data
US 2002/0040825 A1 Apr. 11, 2002

(51) Int. Cl.⁷ .............................................. E04F 17/04
(52) U.S. Cl. ...................................... 181/224; 181/272
(58) Field of Search ............................... 181/224, 292, 181/250, 286; 454/262, 906, 121

(56) References Cited

U.S. PATENT DOCUMENTS

| | | | |
|---|---|---|---|
| 4,100,992 A | | 7/1978 | Rehde et al. |
| 4,287,962 A | * | 9/1981 | Ingard et al. ............... 181/224 |
| 4,298,090 A | * | 11/1981 | Chapman ................... 181/286 |
| 4,378,859 A | * | 4/1983 | Satomi et al. .............. 181/224 |
| 4,410,065 A | * | 10/1983 | Harvey ...................... 181/224 |
| 4,645,032 A | * | 2/1987 | Ross et al. .................. 181/250 |
| 4,787,473 A | * | 11/1988 | Fuchs et al. ................ 181/224 |
| 5,022,943 A | * | 6/1991 | Zaima ........................ 181/292 |
| 5,268,541 A | * | 12/1993 | Pettersson .................. 181/224 |
| 5,276,291 A | * | 1/1994 | Norris ........................ 181/224 |
| 5,518,449 A | * | 5/1996 | Danieau ..................... 454/121 |
| 5,620,366 A | * | 4/1997 | Munzel et al. ............. 454/152 |
| 5,869,792 A | | 2/1999 | Allen et al. |
| 6,116,375 A | * | 9/2000 | Lorch et al. ................ 181/224 |
| 6,450,876 B2 | * | 9/2002 | Elliot ......................... 454/121 |
| 6,508,701 B1 | * | 1/2003 | Foury et al. ................ 454/121 |

FOREIGN PATENT DOCUMENTS

| FR | 2 376 994 A | 4/1978 |
|---|---|---|
| FR | 2 778 153 A | 11/1999 |

* cited by examiner

Primary Examiner—Marlon T. Fletcher
Assistant Examiner—David S. Warren
(74) Attorney, Agent, or Firm—Liniak, Berenato & White

(57) ABSTRACT

Air-diffusion panel for a motor vehicle including at least one air inlet and at least one air duct in communication with the said air inlet and air-distribution means, characterised in that it includes at least one resonant cavity (8) tuned so as at least partially to reduce the airstream noise in the said duct (4, 5, 6).

12 Claims, 1 Drawing Sheet

AIR-DIFFUSION PANEL FOR A MOTOR VEHICLE

FIELD OF THE INVENTION

It is known that panels are present, under the dashboard of motor vehicles, having as their main function that of reducing the transmission of noise emitted under the dashboard towards the rest of the passenger compartment, for example by the motor-driven fan unit of the air-conditioning.

BACKGROUND OF THE INVENTION

The installations for motor-vehicle heating and/or air-conditioning furthermore require air-diffusion ducts to be put in place, which are housed especially in the dashboard, for the front passengers.

However, the ducts are generators of airstream noise since, on the one hand, they receive an airflow generated by the air blower and therefore propagate the vibration from it, and, on the other hand, they exhibit an extremely large surface area through which the noises originating from the blower and/or from the simple flowing of the air can be propagated.

SUMMARY OF THE INVENTION

One object of the invention is to reduce the noise generated by the air ducts.

Another object of the invention is to achieve this noise reduction without complicating the manufacture of the duct or ducts.

Another object of the invention is to improve passenger comfort, especially for the front passengers, by improving the diffusion of the air.

The invention thus relates to an air-diffusion panel for a motor vehicle including at least one air inlet and at least one air duct in communication with the said air inlet and means for air distribution, particularly towards the feet of at least one passenger, characterised in that it includes at least one resonant cavity tuned so as at least partially to reduce the airstream noise in the said duct.

The device according to the invention can be used for diffusion on another surface of the passenger compartment, for example the roof, at least one door and/or at least one lengthwise member, possibly with the application of a decorative trim to the outside, for example by hot application by thermoforming of a bonded fabric, which does not stop up the air-diffusion orifices.

At least one air duct may feature outlets consisting of apertures opening out in at least one panel face.

At least one resonant cavity can be tuned in such a way as at least partially to reduce the noises passing through the said panel. These noises have an airstream origin specific to the duct, or else arise from a different origin, for example from under the dashboard.

The number and the size of the apertures can be configured for a low-speed air diffusion (called "gentle" diffusion), which makes it possible to diffuse air especially towards the passengers'feet without the air speed inducing a direct sensation of heat or of cold.

At least one resonant cavity can be closed.

It may lie alongside an air duct. It may extend between two air ducts.

The panel advantageously includes at least one resonant cavity which opens out into at least one air duct.

The panel may be single-piece, made of thermoplastic material, and be produced by extrusion blow-moulding, for example like the panel described in the French Patent Application No. 98 05397 filed on Apr. 9, 1998 by the Applicant Company and having the title of "Motor-vehicle dashboard panel".

The panel can be produced by thermoforming.

BRIEF DESCRIPTION OF THE DRAWINGS

Other characteristics and advantages of the invention will emerge better on reading the description which will follow, in connection with the attached drawings, in which.

DESCRIPTION OF THE PREFERRED EMBODIMENTS

Figure 1:
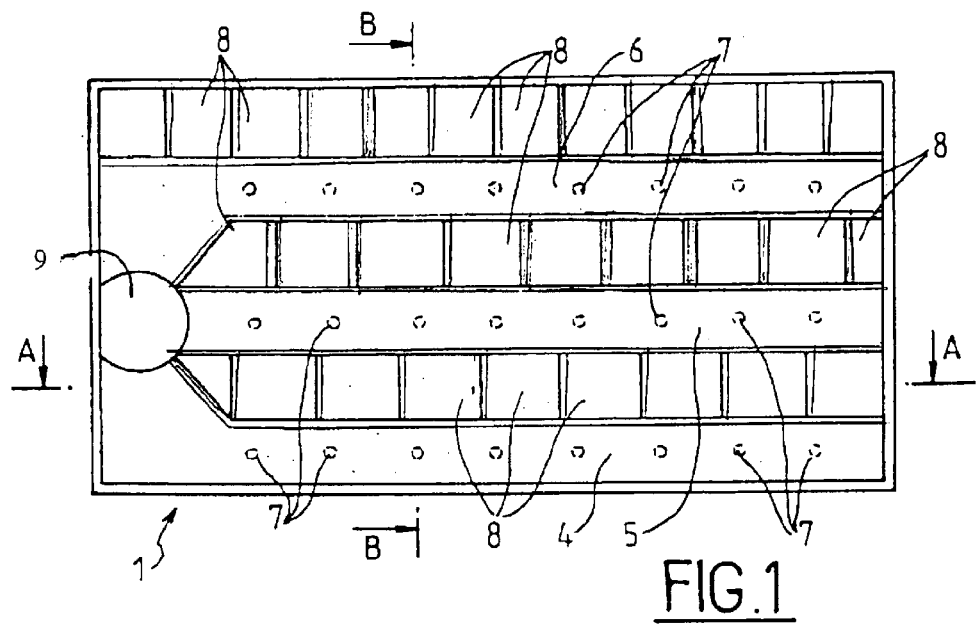
FIG. 1 represents, in top view, an embodiment of a panel according to the invention.
Figure 2A:
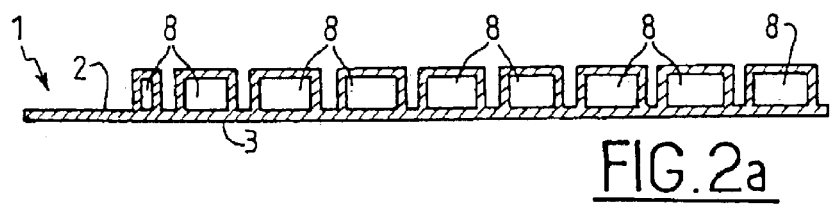
FIGS. 2a and 2b are the cross-sections respectively along AA and BB of the panel of FIG. 1.
Figures 2B, 3:
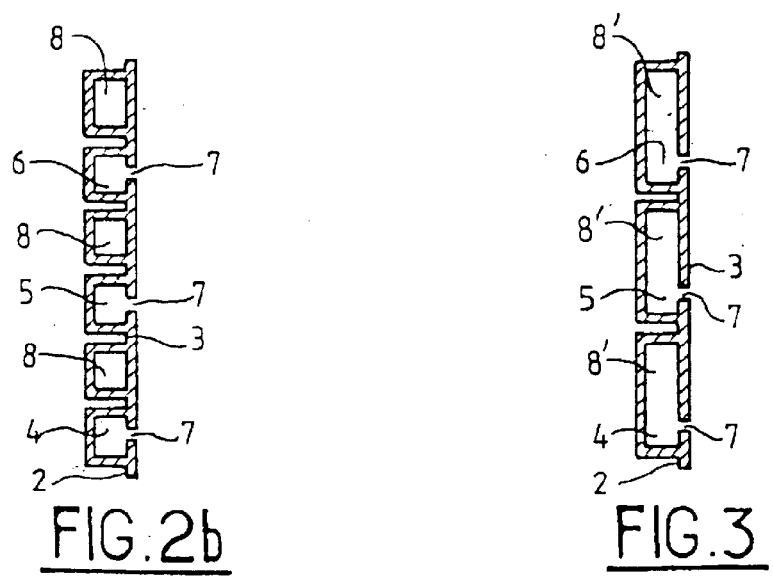
FIG. 3 represents, in section, a variant of the panel of FIG. 1.

The panel 1 represented in FIG. 1 and in FIGS. 2a and 2b exhibits one face called upper face 2, one face called lower face 3 and, extending in relief on this upper face 2, air-diffusion channels 4, 5, 6 which communicate with an air inlet 9.

FIG. 2a in particular shows a row of resonators 8 the dimensions of which may be similar or different, in such a way that they are tuned to one or more frequencies constituting noise sources in the channels, or else to frequencies which are sufficiently close to one another to damp the noise within a range of frequencies. The tuning of the frequencies can be carried out by acting on the dimensions (length, width, height) of the cavities and/or their shape so as to constitute Helmholtz resonators.

In the case of closed cavities, the damping of the noise takes place by resonance on the vibrations communicated to the panel.

In the case of cavities 8' which communicate with one or more ducts (see FIG. 3—section corresponding to the sectional plane BB of FIG. 1), the noise generated in the air outflow is taken into account, and its characteristic frequencies can be damped by the cavities 8'.

As the panel according to the invention is possibly produced by extrusion blow-moulding, it may exhibit complex shapes, matched in particular to panels bordering a motor-vehicle instrument panel.

The ducts 4, 5, 6 advantageously feature air-diffusion apertures 7 which are distributed along their length, and which allow a distributed diffusion. In particular, the number and the cross-section of these apertures 7 can be chosen so that the speed of the air is sufficiently low that the passengers do not perceive a direct sensation of heat or of cold due to the outflow.

The panel can be produced by extrusion blow-moulding, or else by thermoforming, by assembly of two thermo-formed sheets.

The panel according to the invention applies particularly to a lower dashboard panel, the air-distribution means being directed towards the feet of the passengers.

Finally, the panel of the invention, due to its tubular structure, lends itself to forming a structural component featuring air-diffusion functionality. It is sufficient, for that purpose, that the wall thickness is sufficient for the rigidity sought.

Thus an excellent weight/volume/functionality compromise is obtained.

What is claimed is:

1. A motor vehicle air diffusion panel with enhanced sound absorbing characteristics, wherein said motor vehicle air diffusion panel with enhanced sound absorbing characteristics has a first end and an oppositely disposed second end, said panel first end having a single air inlet, said panel second end being enclosed to prevent the flow of air out of said panel, said air inlet having at least two parallel air ducts that converge on said air inlet such that there is air communication between both ducts at said panel first end, each of said parallel air ducts being separated by at least one resonant cavity, each of said resonant cavities being tuned to dampen the noise generated by associated air flow, said parallel air ducts having a plurality of apertures, said plurality of apertures positioned to blow air perpendicular to said parallel ducts, said apertures extending axially from said first end to said second end, said apertures blowing air directly into a motor vehicle passenger compartment.

2. The panel as described in claim 1, wherein said panel is comprised of a single continuous piece of blow molded thermoplastic with sufficient strength to be used as a structural component.

3. The panel as described in claim 1, wherein said panel is substantially planar and has a rectangular shape.

4. The panel as described in claim 1, wherein said panel is oriented within the motor vehicle such that said apertures blow air directly into a motor vehicle floorboard.

5. The panel as described in claim 1, wherein said air inlet is circular to enhance the uniformity of air distribution.

6. The panel as described in claim 1, wherein said air inlet is perpendicular to said at least two parallel air ducts.

7. The panel as described in claim 1, wherein said at least two air ducts are at least three air ducts.

8. The panel as described in claim 1, wherein said at least one resonant cavity is completely sealed.

9. The panel as described in claim 1, wherein said at least one resonant cavity opens directly into said air duct.

10. The panel as described in claim 1, wherein said at least one resonant cavity is at least two resonant cavities.

11. A motor vehicle sound suppression system, said system comprising:

said motor vehicle sound suppression panel having a first end and an oppositely disposed second end, said panel first end having a single perpendicularly disposed air inlet, said panel having a generally planar and rectangular shape, said panel being comprised of a single continuous piece of blow molded thermoplastic, said panel second end being enclosed to prevent the flow of air out of said panel, said air inlet having at least three parallel air ducts that converge on said air inlet such that there is air communication between the at least three ducts at said panel first end, each of said parallel air ducts being separated by at least three resonant cavities, each of said resonant cavities being tuned to dampen the noise generated by associated air flow, said parallel air ducts having a plurality of apertures, said plurality of apertures positioned perpendicular to said parallel ducts, said apertures extending from axially from said first end to said second end, said apertures blowing air directly into the floor board of a motor vehicle passenger compartment.

12. The panel as described in claim 11, wherein said resonant cavities open directly into said air duct.

* * * * *